United States Patent [19]
Rubin et al.

[11] Patent Number: 5,882,741
[45] Date of Patent: *Mar. 16, 1999

[54] MEMBERS HAVING A MULTIAXIALLY ORIENTED COATING OF THERMOTROPIC LIQUID CRYSTALLINE POLYMER AND METHOD AND APPARATUS FOR PRODUCING SUCH MEMBERS

[75] Inventors: Leslie S. Rubin, Newton; Richard W. Lusignea, Brighton, both of Mass.

[73] Assignee: Foster-Miller, Inc., Waltham, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 590,565

[22] Filed: Jan. 26, 1996

[51] Int. Cl.$^6$ ..................................................... C09K 19/00
[52] U.S. Cl. ......................... 428/1; 252/299.01; 385/100; 385/128; 385/141; 428/105; 428/357; 428/364; 428/375; 428/377; 428/379; 428/480
[58] Field of Search ................................ 428/1, 480, 105, 428/357, 364, 375, 377, 379; 252/299.1; 385/128, 100, 141

[56] References Cited

U.S. PATENT DOCUMENTS

| | | | |
|---|---|---|---|
| 3,279,501 | 10/1966 | Donald | 138/118 |
| 3,281,897 | 11/1966 | Mercer | 18/14 |
| 3,615,147 | 10/1971 | Hayashi | 43/1.585 |
| 3,957,565 | 5/1976 | Livingston | 156/500 |
| 4,060,361 | 11/1977 | Ziolko | 425/131.1 |
| 4,182,603 | 1/1980 | Knittel | 425/133.1 |
| 4,332,759 | 6/1982 | Ide | 264/108 |
| 4,355,069 | 10/1982 | Standley | 428/292 |
| 4,368,017 | 1/1983 | Rasmussen | 425/131.1 |
| 4,505,222 | 3/1985 | Holt et al. | 118/304 |
| 4,673,438 | 6/1987 | Wittwer | 106/126 |
| 4,687,430 | 8/1987 | Morris | 425/133.1 |
| 4,734,240 | 3/1988 | Chung et al. | 264/211.13 |
| 4,767,183 | 8/1988 | Martin | 350/96.23 |

(List continued on next page.)

FOREIGN PATENT DOCUMENTS

| | | |
|---|---|---|
| 62-173410 | 7/1987 | Japan . |
| 63-107555 | 5/1988 | Japan . |
| 63-199 622-A | 8/1988 | Japan . |
| WO 92/12840 | 1/1992 | WIPO . |

OTHER PUBLICATIONS

Yamakawa, et al., "New Thermoplastic Dual–Coextrusion–Coating System for Optical–Fibre Drawing", *Electronics Letters*, vol. 20, No. 5, Mar. 1984, pp. 198–201.

Shuto, et al., "High–Temperature Stability of Optical Transmission Properties Attained by Liquid–Crystal Polymer Jacket", *Journal of Lightwave Technology*, vol. Lt–4, No. 6, Jun. 1986, pp. 614–618.

Shuto, et al., "Application of Liquid–Crystal Polyesters to Optical Fiber Jacketing", *Review of the Electrical Communications Laboratories*, vol. 36, No. 3, 1988, pp. 357–361.

Yamamoto, et al., "High Strength, Low Thermal Expansion Coefficient Tight–Jacketed Optical Fiber with Thermotropic Liquid Crystal Polymer", *Mol. Cryst. Liq. Cryst.*, vol. 169, 1989, pp.109–118.

*Primary Examiner*—Nasser Ahmad
*Attorney, Agent, or Firm*—David G. Conlin; Linda M. Buckley

[57] ABSTRACT

Coatings of multiaxially oriented Thermotropic Liquid Crystalline Polymer (TLCP) are provided to elongated members. Suitable members include glass rods, glass fibers, pipes, beams, and other oval or polygonal members having an essentially regular cross-section. Members of ceramic, plastic, or metal can also be coated. This extrusion is performed using a die having inner and outer mandrels capable of rotating in opposite directions. Concentricity between inner and outer mandrels of the die is maintained to assure uniform coating thickness. In order to produce a high level of multiaxial orientation at lower die rotational speeds, the die design may include spiraling feed zones on one or both facing surfaces of the inner and outer mandrels. The application of the multiaxially oriented coating provides superior impermeability to water vapor and oxygen, and increased strength to the elongated member in the axial direction.

17 Claims, 7 Drawing Sheets

U.S. PATENT DOCUMENTS

| | | | |
|---|---|---|---|
| 4,772,089 | 9/1988 | Ide et al. | 350/96.23 |
| 4,778,244 | 10/1988 | Ryan | 350/96.23 |
| 4,801,186 | 1/1989 | Wagatsuma et al. | 350/96.3 |
| 4,810,834 | 3/1989 | Grogl et al. | 174/121 R |
| 4,869,573 | 9/1989 | Radage et al. | 350/96.23 |
| 4,898,924 | 2/1990 | Chenevey | 528/183 |
| 4,904,321 | 2/1990 | Harvey | 156/185 |
| 4,906,066 | 3/1990 | Ryan | 350/96.23 |
| 4,910,057 | 3/1990 | Ide et al. | 428/36.9 |
| 4,923,278 | 5/1990 | Kashyap et al. | 350/96.3 |
| 4,966,807 | 10/1990 | Harvey et al. | 428/220 |
| 4,973,442 | 11/1990 | Harvey | 264/503 |
| 5,002,358 | 3/1991 | Beresford | 350/96.23 |
| 5,135,783 | 8/1992 | Harvey | 428/1 |
| 5,135,793 | 8/1992 | Harvey et al. | 428/1 |
| 5,151,231 | 9/1992 | Lambert et al. | 264/108 |
| 5,156,785 | 10/1992 | Zdrahala | 264/108 |
| 5,248,305 | 9/1993 | Zdrahala | 604/280 |
| 5,288,529 | 2/1994 | Harvey et al. | 428/1 |
| 5,302,334 | 4/1994 | Pierini et al. | 264/233 |
| 5,396,104 | 3/1995 | Kimura | 257/784 |
| 5,461,898 | 10/1995 | Lessen | 72/256 |
| 5,529,741 | 6/1996 | Rubin | 264/435 |

MEMBERS HAVING A MULTIAXIALLY ORIENTED COATING OF THERMOTROPIC LIQUID CRYSTALLINE POLYMER AND METHOD AND APPARATUS FOR PRODUCING SUCH MEMBERS

GOVERNMENT LICENSE RIGHTS

The U.S. Government has certain rights in this invention, as provided for by the terms of Contract No. N66001-89-C-7082 awarded by the Department of the Navy, Naval Ocean Systems Center, San Diego, Calif.

Cross-Reference to related patents, assigned to the assignee of the present invention, the disclosures of which are incorporated by reference U.S. Pat. No. 4,966,807, HARVEY et al./FOSTER-MILLER INC., Oct. 30, 1990;

U.S. Pat. No. 4,973,442, HARVEY et al./FOSTER-MILLER INC., Nov. 27, 1990;

U.S. Pat. No. 5,135,783, HARVEY et al./FOSTER-MILLER INC., Aug. 4, 1992;

U.S. Pat. No. 5,288,529, HARVEY et al./FOSTER-MILLER INC., Feb. 22, 1994.

FIELD OF THE INVENTION

The present invention relates generally to elongated members having a coating of multiaxially oriented thermotropic liquid crystalline polymer (TLCP), and to methods of, and apparatus for, producing such members. Suitable members include glass, plastic, ceramic, or metal rods or fibers, tubes, pipes, or beams. These members may be of any desired length, or indefinite length.

BACKGROUND

It is among the objectives of modern materials science to develop coatings which have improved strength, flexibility, tolerance to hostile environmental conditions, and improved gas- and liquid-barrier properties.

Recent advances in polymer technology have provided new materials which have improved properties.

Rod-like, extended-chain, aromatic-heterocyclic polymers have received considerable interest in both academic and industrial laboratories over the past two decades. These "ordered" polymers include "thermotropic" liquid crystalline polymers, which are modified by temperature changes. Thermotropic LCPs are of great interest because they exhibit a partially ordered state that is intermediate between a three-dimensional ordered crystalline state, and the disordered or isotropic fluid state. As a consequence of their molecular ordering, LCPs are anisotropic, i.e. their properties are a function of molecular direction (R. A. Weiss and C. K. Ober, "Liquid Crystalline Polymers," A.C.S. Symposium Series 435 (1990)).

Structurally many commercial LCPs consist of rigid mesogenic monomer units connected with either flexible spacers or "kink structures" to make them tractable and processable. The high degree of molecular order that can be achieved with the LCP molecules allows this material to attain a very tight packing density, similar to a log jam in a river. LCPs derive their outstanding properties from this tightly packed rigid-rod formation which at a macroscopic level results in a structure that is self-reinforced through the strong interaction of electron-deficient and electron-rich benzene rings.

Because of their rigid backbone structure with flexible spacer groups, commercially available thermotropic LCPs have far higher tensile strength and flexural moduli than conventional polymers.

One important application for coating technology is the coating of optical fiber used in the telecommunications and aerospace industries. Ultraviolet-cured epoxy acrylate (UVEA) has emerged as a frequently used material because it can be successfully applied during the high-speed optical fiber drawing (manufacturing) process. While UVEA is satisfactory for many telecommunications applications, there are other applications for which UVEA is not optimal. For example, UVEA does not satisfy the requirements of rapidly deployable data links, which are used for transmitting guidance signals in aerospace applications. In order to prevent water-induced stress corrosion on an optical fiber, one typically needs to use UVEA coating 3 mil (0.0762 mm) thick which is heavier than a 1 mil (0.0254 mm) TLCP coating and also bulkier, resulting in a limited length of coated fiber which can be accommodated on a spool, carried on an aircraft for payout. This means the object to be guided can be guided only for a shorter distance. Further, UVEA has higher surface friction than TLCP, which means that UVEA tends to cause more "sticking" or "blocking" during unspooling than TLCP.

Although thermotropic LCPs possess a variety of properties that make them an attractive candidate for coating purposes, standard LCP processing results in material with uniaxial orientation (all molecules aligned in one direction). Such materials have very good machine (extrusion) direction (MD) mechanical properties and very poor transverse direction (TD) mechanical properties. If standard extrusion techniques are used to extrude LCPs over a tubular structure, the resulting LCP coating with its axial molecular orientation would readily split in the axial direction, when exposed to bending. For example, conventional uniaxial TLCP coatings, when applied to a flexible optical fiber member, are likely to split along the fiber axis when subjected to bending. Such uniaxially oriented material also has a highly negative coefficient of thermal expansion ("CTE") in the extrusion direction and a highly positive CTE in the transverse direction. This characteristic is generally unacceptable for coating members which will be exposed to thermal cycles. In such cases, it is desirable to have the CTE of the coating more closely approach the CTE of the member.

SUMMARY OF THE INVENTION

Accordingly, the present invention provides a TLCP coating in which the molecules are multiaxially oriented. This multiaxially oriented TLCP coating offers both improved resistance to splitting, and closer matching of its Coefficient of Thermal Expansion (CTE) to the CTE of the member.

Briefly; this is accomplished by extruding the TLCP coating onto the elongated member using an extrusion die, in which the TLCP is extruded from an annular gap between an inner mandrel and an outer mandrel, which rotate in opposite directions with respect to each other. This counter-rotation causes transverse shear to provide the multiaxial orientation. The spatial orientation of the extruded molecules is expressed in terms of the angle between the axis of extrusion ("machine direction") and the direction of molecule alignment or orientation. In a preferred embodiment, each spatial orientation of a multiaxially oriented TLCP coating defines an angle in the range of 5 degrees to 75 degrees with respect to machine direction. If a first direction is $+\theta°$ with respect to machine direction, the second direction can be set to $-\theta°$ with respect to machine direction. If $+\theta=+45°$ and $-\theta=-45°$, this is referred to as "balanced biaxial orientation." Such material has an improved "property balance" because the tensile strength in the transverse direction is close to, or equal to, the tensile strength in the machine direction. Some of the molecules are aligned at an angle to the axis of extrusion, so if the biaxial or multiaxial coating is nicked at one point, the nick is unlikely to propagate, and develop into a split along the longitudinal axis of the member, as would likely occur in a uniaxial coating, in which the molecules align parallel to the axis.

Alternatively, one can extrude TLCP material in which a positive orientation value +θ has a different absolute value from a negative orientation value −ø, within the range mentioned above, to strengthen the coating or change its CTE in a particular direction. For example, in a pressure vessel, circumferential or hoop stress is twice the stress in the longitudinal direction; for such an application, one could run the outer die mandrel fast enough to obtain relatively high multiaxial orientation on one surface for high transverse (hoop) strength, and run the inner mandrel slow enough to obtain less multiaxial orientation on the other surface and more axial strength than would be provided by an equally multiaxial orientation. Conversely, one could run the inner mandrel faster.

The multiaxially oriented coatings of the present invention, as compared with uniaxially oriented coatings, possess desirable properties, including:

(a) increased tensile strength in the transverse direction;
(b) increased modulus in the transverse direction;
(c) controllable coefficient of thermal expansion (CTE), either negative, positive, or zero in the in-plane dimensions of the film or coating, e.g. circumferential or axial directions;
(d) low moisture pickup (most preferably, less than 0.5% weight gain in water at 100° C. for 24 hours); and
(e) low water-vapor permeability (preferably less than 0.001 gm-mil/100 sq. inch/24 hours=0.000394 gm-mm/m$^2$/24 hours).

Further, the improved properties possessed by the multiaxially oriented TLCP coatings of the present invention mean that one can provide the same or better protection to the coated member than a thicker layer of a prior art coating provides, so that, applied to an optical fiber, the TLCP coating could for example provide a 60 percent reduction in linear mass density, compared to a standard, 3-mil (0.0762 mm) thick, coating of UVEA on such an optical fiber. One could therefore wrap a longer length of coated fiber onto a spool. Due to the reduction in weight per unit length, one could deploy a greater length of coated fiber, for example from an aircraft.

Multiaxial orientation can be used to "tailor" the CTE of the LCP coating. This is possible because the CTE of the LCP molecule in the fibril or axial direction is typically negative (−7 to −12 ppm/°C.) and in the transverse direction is positive (+50 to +100 ppm/°C.). The CTE of multiaxial coatings can be varied from a slightly negative value (uniaxial orientation) to a relatively high positive value by increasing the degree of multiaxial orientation. This permits matching the CTE of the coating to the CTE of the member to which the coating will be applied. This is desirable because, as is well known, any mismatch between the CTE of a member and its coating has a tendency, when temperature changes, to cause separation or delamination at the interface or boundary between the two materials. This is particularly true if the temperature change is repeated or cyclic, for example, in an outdoor environment where temperature is high during daylight hours and low at night. In lunar or other space environments, such changes can be sudden.

DETAILED DESCRIPTION

Figure 1A:
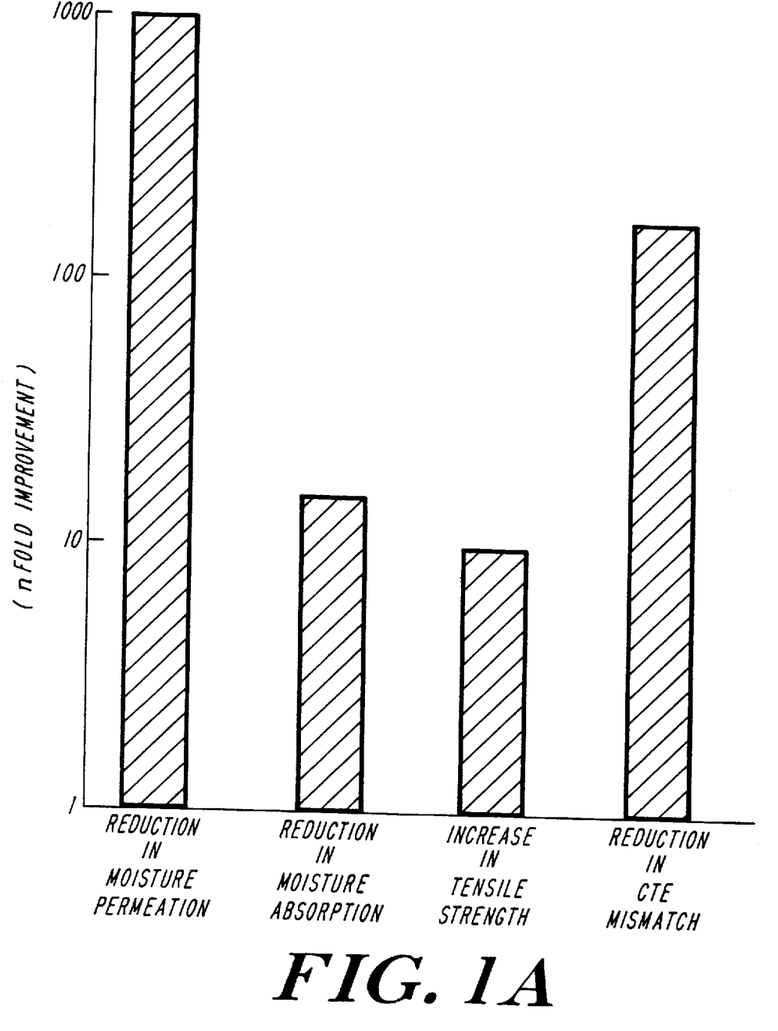
FIG. 1A is a bar graph illustrating the n-fold improvement in certain properties, of thermotropic LCP, compared to UVEA.

FIG. 1A illustrates four ways in which thermotropic LCP is superior to UV-cured epoxy acrylates (UVEA), a prior art coating material. The UVEA tested was DeSolite® 950-008, four mils (0.1016 mm) thick. TLCP provides a reduction in moisture permeation, a reduction in moisture absorption, an increase in tensile strength, and a reduction in mismatch of respective coefficients of thermal expansion (CTE) between the coating and a member, for example glass.

Figure 1B:
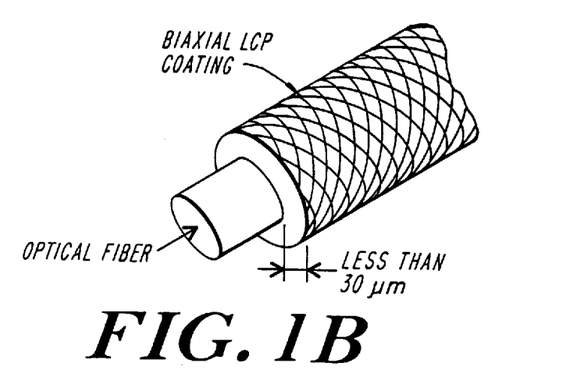
FIG. 1B is a schematic perspective view of a multiaxially oriented LCP coating, applied to an optical fiber.

FIG. 1B illustrates schematically a coating of thermotropic liquid crystalline polymer (TLCP) applied to a generally cylindrical member, in this example an optical fiber. The criss-crossing helical lines indicate that the inventive method used to extrude the coating has caused the long-chain polymer molecules to align along at least two diverging directions within the single coating ply. This is defined as "biaxial" orientation of the molecules. These directions need not be constant along the longitudinal axis of the member and extrudate ("machine direction"), but rather can rotate. The direction normal to the axis of extrusion (i.e., radial direction) is known as the "transverse direction."

The following definitions of multiaxially oriented TLCP material characteristics will be important in understanding the present invention:

| | |
|---|---|
| balanced biaxial | a material having maximum strength and stiffness at approx. ± 45 deg. of the machine direction, but exhibiting the least angular dependence of these properties. |
| Predominantly uniaxial | a material having maximum strength and stiffness in the machine direction, but also with some strength within ± 20 deg. of the machine direction. |
| nearly uniaxial | a material having maximum strength and stiffness in the machine direction, with some strength within only ± 5 deg. of the machine direction. |

Figure 2:
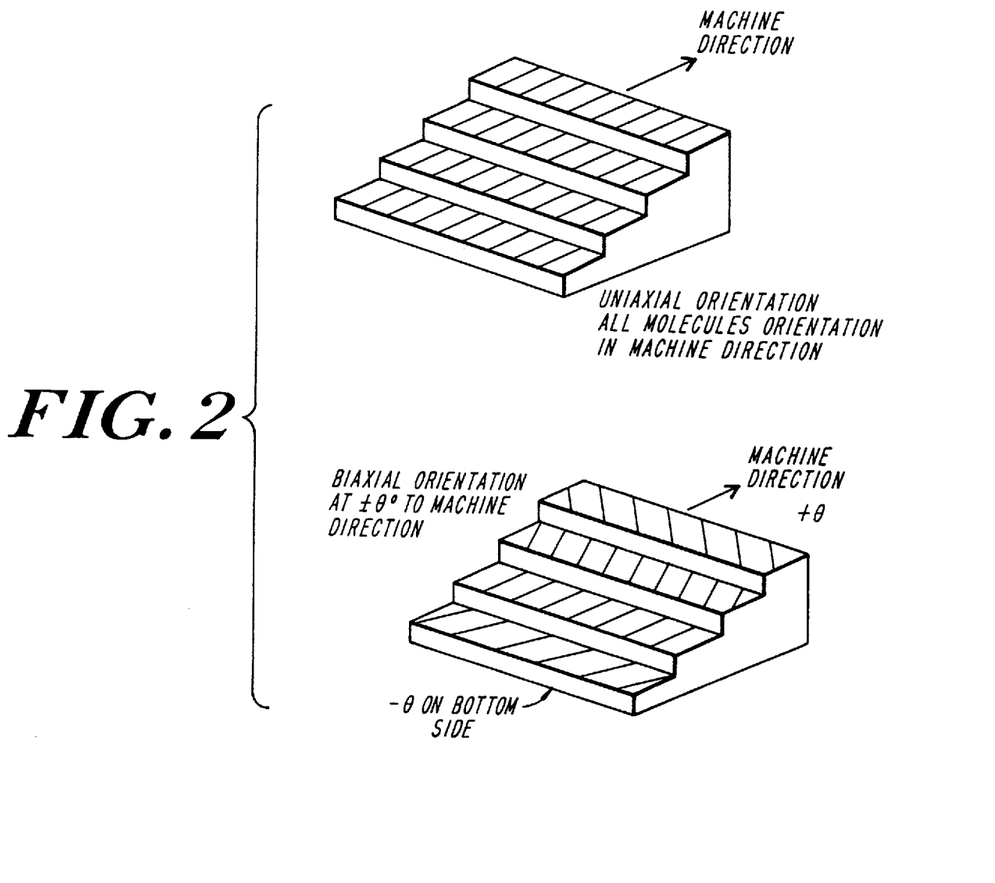
FIG. 2 illustrates the difference between uniaxial orientation and multiaxial orientation, in a single-layer LCP.

FIG. 2 shows the morphology of oriented LCP coatings. Scanning Electron Microscope photographs of a thermotropic LCP multiaxial film, which was frozen in liquid nitrogen and broken to reveal the internal fibrillar structure, reveal that the molecular orientation gradually changes from +θ to −θ as we pass from one side of the film to the other. Fibrillar orientation actually spirals or curves as one moves deeper into the film thickness. Because multiaxial orientation provides transverse (circumferential) strength and there is a spiraling molecular orientation through the thickness, the resulting coating resists splitting induced by any bending of the coated member.

As used herein, the generic term for those orientations which do not satisfy the specific definitions above, but which provide strength to a material in both the machine and transverse directions is "multiaxial."

Novel LCP extrusion technologies disclosed, e.g. in U.S. Pat. Nos. 4,871,595; 4,939,235; 4,963,428; 4,966,807, and 4,973,442, are used in the practice of the present invention. However, these extrusion technologies are directed to formation of film and to tubular structures, not coatings, and it was not previously known how to extrude TLCP around an elongated member and to form a uniform coating of multiaxially oriented TLCP on the surface of the member. U.S. Pat. No. 4,898,924, CHENEVEY et al., col. 14–15, describe attempts at making such a coating, but note that defects such as weld lines and shrinkage cracks resulted from these attempts.

Preferably, production of a uniform multiaxially oriented coating is achieved, in accordance with the present invention, by feeding the elongated member axially out through the inner mandrel, at a speed faster than the annular discharge rate of the TLCP extrudate. The elongated member is maintained concentric with the annular gap, to assure uniform coating thickness. Preferably, this is done by attaching bushings on the inner mandrel. In order to prevent heat damage to the elongated member, a thermally insulating sleeve may be used inside the inner mandrel.

The rotation of the counter-rotating mandrels creates transverse shear flows that are superimposed on the axis shear developed as the polymer melt is extruded through the die. The angle that the LCP fibrils make with the longitudinal axis of the tubular extrudate can be readily varied from ±5 to ±75 degrees. For a given degree of multiaxial orientation, the die rotation speed is directly proportional to the rate at which the member is fed through for coating, e.g. the optical fiber drawing rate in the case of coating optical fiber. It was determined that, in general, the degree of multiaxial orientation provided by different operating parameters can be approximated by using the following equation, in which e is the angle of biaxiality:

$$\theta = \arctan(BR \cdot V \cdot k/W)$$

and where BR is the ratio of the diameter of the coated member to the die discharge gap diameter; V is the product of radius R of the die discharge gap times rotation speed ω (radians/sec) of each mandrel of said die, k is a value (constant for a particular die) related to the internal flow path geometry of different die configurations, e.g. with and without spiral feed zones (as discussed below), and W is the axial rate at which the extruded TLCP is deposited on the elongated member, e.g. by drawing onto the moving member. While this equation represents the basic factors involved in achieving multiaxial orientation, as best understood at the present time, it is not intended to exclude the possibility of achieving greater or lesser multiaxial orientation than the equation predicts. The fundamental point is that the method of the present invention imparts enough multiaxial orientation to the TLCP material to make the resulting coating useful in applications where unaxial coatings would not be useful.

The longitudinal axis of the extrusion die may be oriented vertically or horizontally, depending upon what one is coating. For example, for use with an optical fiber drawing tower, the extrusion die would have its axis oriented vertically. For use in coating a non-flexible elongated member, such as a pipe, the extrusion die could have its axis oriented horizontally.

In order to improve adhesion between the member and the coating, it may be desirable to apply adhesive to the outer surface of the member before applying the LCP coating. One may also want to extrude more than one coat of LCP onto the member. Adhesives may be added between the layers by alternating adhesive extruders and LCP extruders along a production line. A variety of adhesives useful for adhering a TLCP to a surface are known, and may be used for this purpose.

Although the examples described below relate to members having a generally cylindrical stiff or flexible structure, i.e. circular cross-section, the method will work with members having oval, rectangular, polygonal, or other essentially regular cross-section. In the case of a member which has an irregular cross-section, supplemental steps would likely be required to bring the coating into contact with the inside corners or other recesses in the member being coated. For example, coating an I-beam shape might require application of suction or vacuum just after the extruded TLCP leaves the die discharge gap, to pull the TLCP toward the member, or application of external air pressure or the like, to push the TLCP onto the member. A hexagonal array of radially inwardly directed airjets would be suitable.

PREFERRED TYPES OF THERMOTROPIC LIQUID CRYSTAL POLYMER MATERIALS

Suitable thermotropic LCPs for use in the present invention include wholly and partially aromatic polyesters and copolyesters such as those disclosed in U.S. Pat. Nos. 3,991,014, 4,067,852, 4,083,829, 4,130,545, 4,161,470, 4,318,842, and 4,468,364.

Preferred thermotropic LCPs include wholly or partially aromatic polyesters or copolyesters. Particularly preferred wholly aromatic and partially aromatic copolyesters comprise 6-oxy-2-naphthoyl moieties and p-oxybenzoyl moieties. Particularly preferred copolyesters include VECTRA®, ZENITE® (E.I. duPont de Nemours) and XYDAR® (Amoco, formerly Dartco). Other preferred thermotropic liquid crystal polymers include SUMIKASUPER® and EKONOL™ (Sumitomo Chemical), DuPont HX™, RODRUN® (Unitika) and GRANLAR™ (Grandmont).

VECTRA®, a wholly aromatic copolyester sold by Hoechst Celanese Advanced Materials Group, Summit, N.J., is one particularly preferred TLCP for use in the present invention. VECTRA® is commercially available with varying amounts of 6-oxy-2-naphthoyl and p-oxybenzoyl moieties, with various fillers, and in various grades. VECTRA® A950 is a particular neat (unfilled) resin. VECTRA A900 was formerly a more highly filtered grade than VECTRA A950, but A950 is now just as filtered, and is reported to be essentially the same material chemically. Use of the grade designation "A900" is believed to have been discontinued. Therefore, the term "VECTRA A950" is used in the following description, although some of the Figures refer to A900.

VECTRA® A950 is reported to be the most ductile grade in the VECTRA product line. This polymer has been reported to consist essentially of about 25–27 percent of 6-oxy-2-naphthoyl moieties and about 73–75 percent of p-oxybenzoyl moieties, as described in example 4 of U.S. Pat. No. 4,468,364 and in G. W. Calundann et al., "Anisotropic Polymers, Their Synthesis and Properties", reprinted from Proceedings of the Robert A. Welch Conferences on Chemical Research, XXVI Synthetic Polymers, Nov. 15–17, 1982, Houston, Tex., pp. 247–291 (see especially pp. 263–265).

Figure 3:
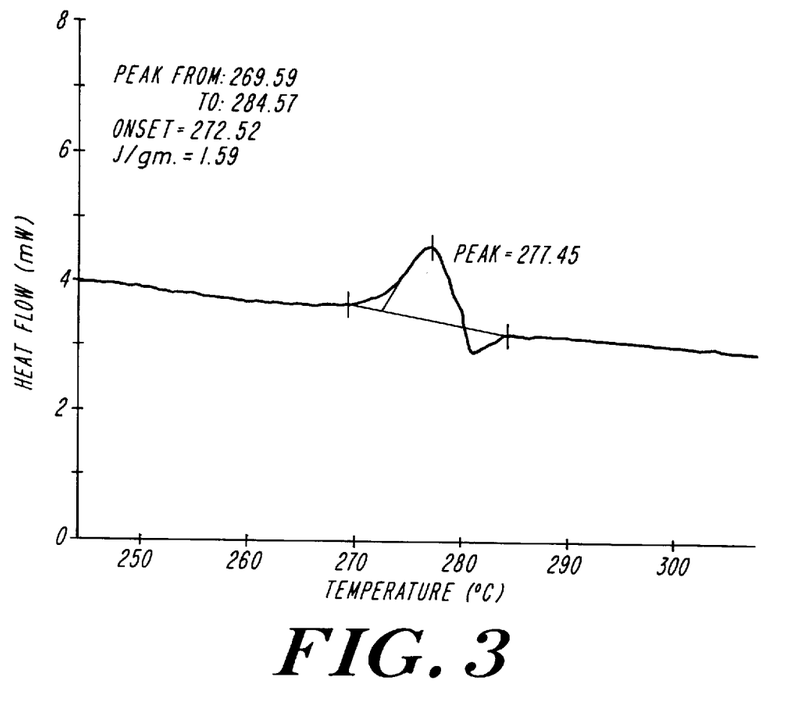
FIG. 3 is a graph illustrating the results of a Differential Scanning Calorimetric ("DSC") analysis of VECTRA®, a wholly aromatic copolyester thermotropic LCP.

FIG. 3 is a graph illustrating the results of a Differential Scanning Calorimetric ("DSC") analysis of VECTRA® A950. It is preferred because it has a relatively wide melt-processing temperature range "window" of about 269° C. to about 285° C., indicated by the rise shown in heat flow (mW). VECTRA A950 has a specific gravity of 1.4, a tensile strength of 85,000 psi ($5.86\times10^9 N/m^2$), a tensile modulus of about 6,000,000 psi ($4.14\times10^{18} N/m^2$), and a melting point of 535° F. or 296° C. It has a melt viscosity at 570° F. (300° C.) of about 600 poise. It has a bulk coefficient of thermal expansion (CTE) of about 140 ppm/°C. (77.8 ppm/°F.). In a highly oriented state, the CTE can be as low as −10 ppm/°C. (−5.6 ppm/°F.) in the oriented direction.

Another preferred thermotropic LCP is ZENITE®. This polymer has been reported to consist of hydroxy-benzoic acid/phenyl hydroquinone/dimethyl-napthylene dicarboxylate units.

COATING APPARATUS AND PROCESS PARAMETERS

Figure 10:
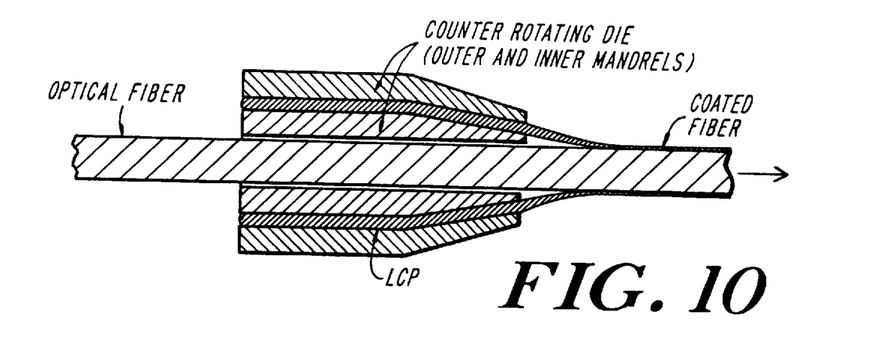
FIG. 10 is a cross-sectional view, illustrating the extrusion of multiaxial TLCP coating onto an optical fiber.

The extrusion of multiaxially oriented LCP films, and multiaxially oriented LCP coatings over glass rods, was performed by use of a counter-rotating die as shown in FIG. 10 and described in, e.g., U.S. Pat. Nos. 4,973,442 and 5,288,529. However, other die arrangements that provide the desired multiaxiality can be used in the methods of the present invention.

Figure 4:
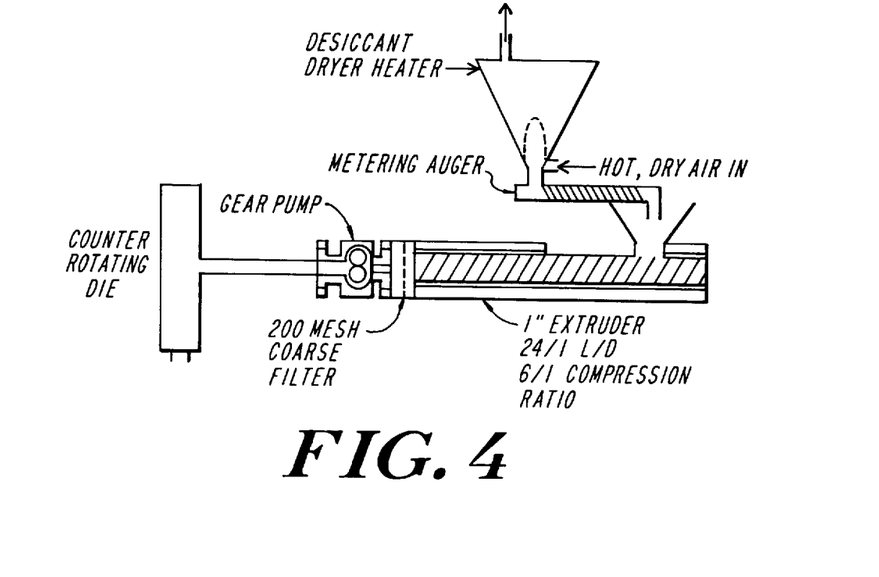
FIG. 4 is a schematic diagram of a suitable apparatus for supplying liquid TLCP to the counter-rotating die.

FIG. 4 is a schematic showing system components of one extrusion system that can be used in the practice of the present invention. A desiccant dryer bin removes moisture from the LCP pellets, prior to their being fed into the extruder. A single-screw metering auger, connected to the bottom of the bin, volumetrically feeds pellets into the extruder at a controlled rate. A pointed tip high compression extruder screw generates shear and eliminates dead spots at the exit of the extruder. The extruder itself is a Killion laboratory scale model with a 1 in. (2.54 cm) diameter screw and a 24 in. (61 cm) long barrel.

The extruder has three zones, each with its own heaters. The first is the feed zone where melting begins. The beginning of this zone is water-cooled at the throat to prevent material bridging. A compression zone is used to completely melt the pellets and to pressurize the melt. The last zone is used to generate high levels of shear and provide a reasonable level of throughput control.

At the exit of the extruder, a coarse filter removes degraded material and nonmelted particulates (50 to 100 μ) from the melt. The coarse filter preferably comprises 200 mesh wire screen, sandwiched between two 80 mesh screens and supported by a breaker plate. On the exit side of the course filter, a gear pump accurately meters the melt into the counter-rotating die at a controlled feed rate and steady pressure. The gear pump preferably is housed in a large block which contains heaters and instrumentation to monitor pump pressure and the melt temperature. A fine filter removes particles whose size is 10 micrometers or larger (degraded material and non-melted particulates) from the LCP melt.

Figure 5:
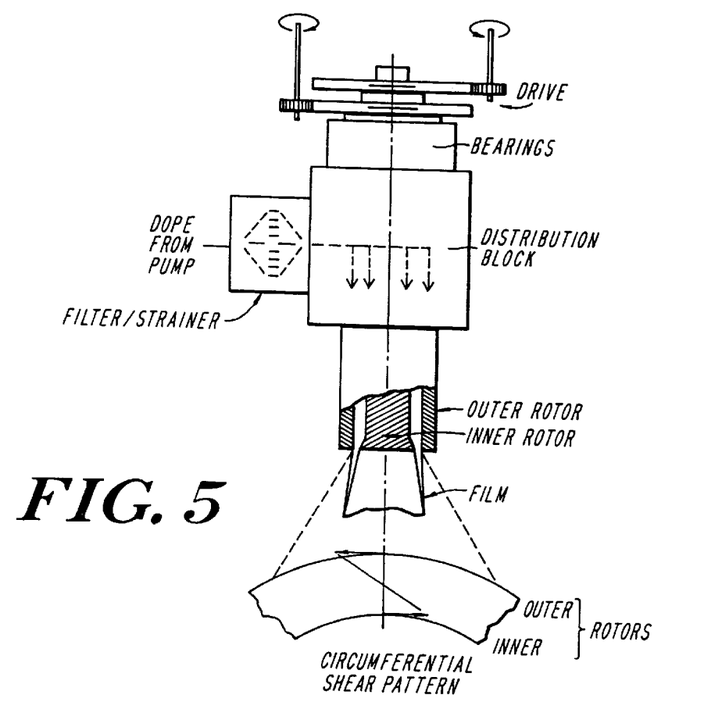
FIG. 5 is a schematic diagram of the counter-rotating die, showing the inner and outer rotors or mandrels.

The gear pump feeds a counter-rotating die, shown in FIG. 5, which provides additional shear thinning and a controlled degree of multiaxial orientation to the extrudate. The basic design of this die utilizes bearings and a drive system which are located above and isolated from the melt flow path of the polymer. This design feature protects components from the high processing temperatures associated with thermoplastic/thermotropic melts (up to 800° F. or 427° C.).

Melted LCP enters the die at a point below the lowest bearing and is directed into the annulus, between the counterrotating mandrels, where the LCP is exposed to shear thinning. Metal piston rings are used to seal and prevent the melt flow from traveling up between the counter-rotating mandrels. Metal piston rings in combination with bleed holes are used to prevent melt flow from passing into the gap between the die housing and the outer rotating mandrel. Electric heaters are mounted on the die housing and melt flow block.

A take-up system assists the extrusion process by generating controlled pultrusion. The take-up system for films consists of two variable-speed, chrome-plated pinch rollers; in the case of coatings, a member advancing system is used. Preferably, the elongated member is advanced through the die faster than the TLCP is extruded, so that the tension exerted on the extruded TLCP helps to draw it down onto the surface of the member, and to form a coating of the desired thickness.

All variable-speed drives on extrusion components are equipped with feedback logic to ensure that the desired rotational speed is maintained. Such controls are found on the extruder, the gear pump, the counter-rotating die mandrels and the take-up system. Temperature controllers with feedback are integrated into the following components: desiccant dryer, three extruder locations, coarse filter, pump block and the top and bottom of the counter-rotating die. Pressure transducers are located at critical points to help monitor the characteristics of the melt, protect equipment from plugging, and control residence time in the extruder. Pressure transducers are located at the following locations: discharge of extruder just before the coarse screen, pump inlet and die inlet.

Conditions suitable to achieve the desired degree of multiaxial orientation of the TLCP coatings of the present invention can be determined for the particular TLCP and extrusion system, for example, by extruding multiaxially oriented TLCP films.

Using the extrusion system shown in FIG. 4, 1-mil (0.0254 mm) thick multiaxially oriented VECTRA® films, at orientations of ±10, 20, 30, and 45° to the machine (axial) direction, were produced. These orientations were achieved by changing control parameters such as feed rate, die rotational speed, and draw rate. The discharge diameter used was 1.125 inch (2.86 cm). The following system temperature profile was used:

| | |
|---|---|
| Extruder zone 1: | 480° F. (249° C.) |
| Extruder zone 2: | 510° F. (266° C.) |
| Extruder zone 3: | 520° F. (271° C.) |
| Pump block: | 530° F. (277° C.) |
| Die top and bottom: | 510° F. (266° C.) |

Given a constant die structure, increasing die rotational speed increases the degree of multiaxial orientation. High rotation speeds of the mandrels can, in some instances, cause "melt fracture" in some TLCPs, leading to holes in the extruded multiaxially oriented TLCP coating. One way to reduce such melt fractures is to rotate the mandrels at a lower rate of rotation.

Figure 13:
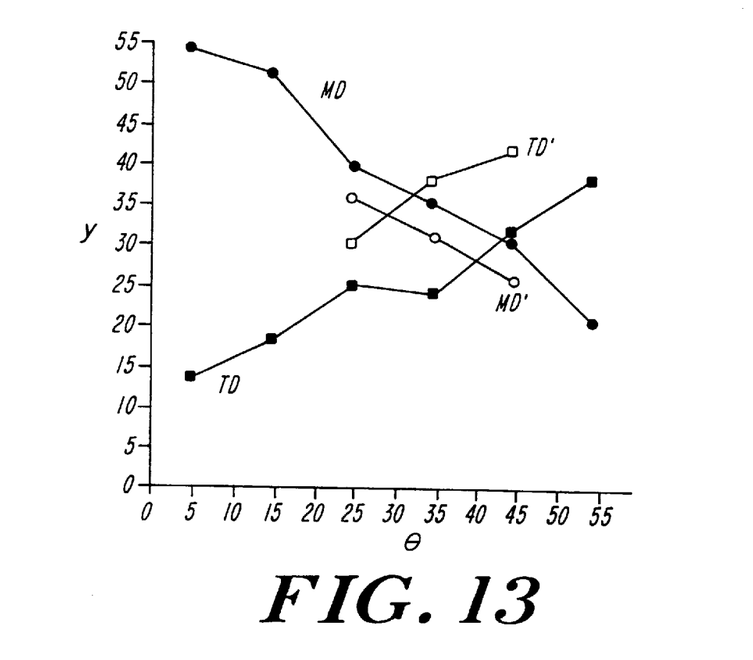
FIG. 13 is a graph showing comparative results of extrusion operations with and without grooved feed zones in the die.

Lower die rotation speeds typically result in a lower degree of multiaxial orientation. However, a higher degree of multiaxial orientation may be desired, e.g., to bring the CTE of the coating closer to that of the elongated member. It was found that the degree of multiaxial orientation could be increased at lower die rotation speeds by forming the surface of at least one of the inner and outer mandrels of the die with spiral grooves or feed zones, a short distance upstream of the die discharge gap. A die with 8 parallel spiral grooves on the inner mandrel was tested, and it is believed that a die with spiral grooves on facing surfaces of both mandrels would be even more effective in causing transverse shear, resulting in greater multiaxial orientation. FIG. 13 is a graph of results of tests of VECTRA® film, 2 mil (0.0508 mm) thick, produced with settings for varying degrees $\theta$ of multiaxial orientation, with and without a spiral feed zone. The y axis indicates peak tensile strength (kpsi), in machine direction (MD) and in transverse direction (TD). The solid circles (MD) and squares (TD) indicate results without a spiral feed zone, on a first die. The open circles (MD') and squares (TD') indicate results on a second die, with a spiral feed zone. The fact that the line TD' with a spiral feed zone is substantially higher than the line TD without the feed zone indicates that the use of this zone increases the transverse strength of the resulting extruded film. Line MD' is lower than line MD, indicating lower axial strength. Measured tensile strengths (kpsi; 1 kpsi=6 894 760 Pascal) were as follows:

| | DEGREE OF BIAXIALITY | | | | | |
|---|---|---|---|---|---|---|
| | 5° | 15° | 25° | 35° | 45° | 55° |
| MD | 54.8 | 52.3 | 39.7 | 35.3 | 30.8 | 21.9 |
| MD' | | | 35.5 | 31.9 | 26.1 | |
| TD | 14.6 | 17.8 | 25.1 | 24.3 | 31.2 | 37.7 |
| TD' | | | 30.3 | 35.6 | 40.4 | |

The depth and number of the grooves useful in achieving the desired multiaxial orientation with a particular die configuration and a particular TLCP can be readily determined by the skilled artisan, for example, by extruding and testing film, as described below in connection with determining the processing conditions to achieve a desired multiaxial orientation.

Preferably, the spirals on one mandrel would be threaded the opposite way from the spirals on the other facing mandrel surface. Preferably the depth of the grooves, compared to the distance between the inner diameter (ID) of the outer mandrel and the maximum outer diameter (OD) of the inner mandrel, falls in a range between about 0% at the end of the spiral feed zone to about 600% of the distance, at the beginning of the spiral feed zone. When extruding VECTRA® A950, on an inner mandrel 1.2 inches (3.048 cm) in diameter, about 6 grooves per inch (about 2.36 grooves per cm) is a suitable value.

Figure 11:
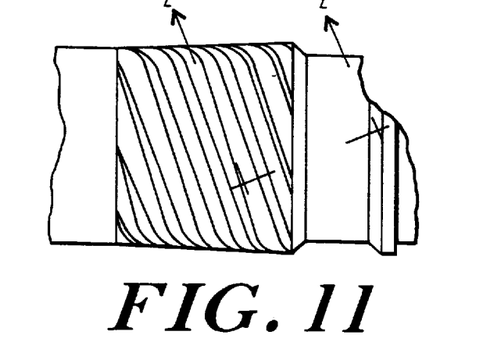
FIG. 11 is a side view of an inner mandrel of an extrusion die, on which a feeding zone or set of spiral grooves has been formed.
Figure 12:
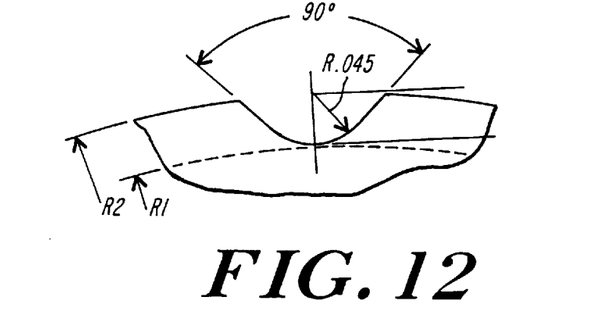
FIG. 12 is a cross-sectional view along section line L—L of FIG. 11, illustrating how the grooves are shaped.

FIG. 11 illustrates schematically how the inner mandrel of the extrusion die referred to above was formed with a "spiral feeding zone" or set of spiral grooves. Eight spiral grooves, equally spaced around the circumference of the inner mandrel, were formed. The bottom of each groove was maintained at a constant radius R1 (0.575 inches or 1.4605 cm, i.e. diameter 1.15 inches or 2.921 cm) from the central axis of the mandrel, but the depth of the grooves decreased in the melt flow direction by varying the radius of the peak surface (i.e. the outermost diameter) of each groove from a maximum radius R2 (0.6175 inch or 1.568 cm, i.e. diameter 1.235 inch or 3.1369 cm) to the minimum radius R1 at the end of the spiral feed zone, which was about 3–4 inches (7–10 cm) from the discharge gap. The minimum radius R1 is indicated by the dashed line. In other words, the depth of the groove became zero at the end of the spiral feed zone, producing a gap between inner and outer mandrels of about 50 mils (1.27 mm) at that point. At the discharge, the gap was about 25 mils (0.635 mm). The inner diameter of the outer mandrel was 1.250 inch (3.175 cm). One of ordinary skill in the TLCP extrusion art can scale these dimensions up or down, as desired, for the particular extrusion or coating application.

The processing parameters will also depend upon the particular TCLP to be extruded. In the case of VECTRA® A950, the LCP retention time is up to 10 minutes, but preferably less than 5 minutes, and most preferably less than 3 minutes. Longer retention times typically result in material degradation.

Multiaxially oriented TCLP film was produced, to determine the properties of TLCPs made with various parameter settings, and processing conditions for coating elongated members.

EXAMPLE 1

PRODUCTION OF MULTIAXIALLY ORIENTED TLCP FILM

VECTRA® pellets were conditioned in the desiccant dryer at 150° C. for 4 hours. The pellets were then fed into the extruder through a metering auger. "Extruder starve" feeding conditions were maintained at all times. A high-compression screw, 6:1 ratio, was used to create maximum shear in the melting zone. The extruder operated at 84 RPM (Revolutions Per Minute) to achieve the desired shear rate and maintain a residence time, within the extruder, which was less than 3 minutes. The extruder had a barrel length L of 24 inches (60.96 cm), and a screw diameter D of 1 inch (2.54 cm) and an L/D ratio of 24/1. The pump was large enough to provide a flow of TLCP exceeding 33 grams/minute. Sufficient lengths of multiaxially oriented film at each of the four desired orientations was produced. Selected samples from each of the four film extrusion runs were tested for tensile strength, modulus and elongation-to-break, according to the standard ASTM D882 of the American Society of Testing Materials. The highest machine direction and lowest transverse direction tensile strength and modulus are found when there is a low degree of biaxial orientation.

Figure 6:
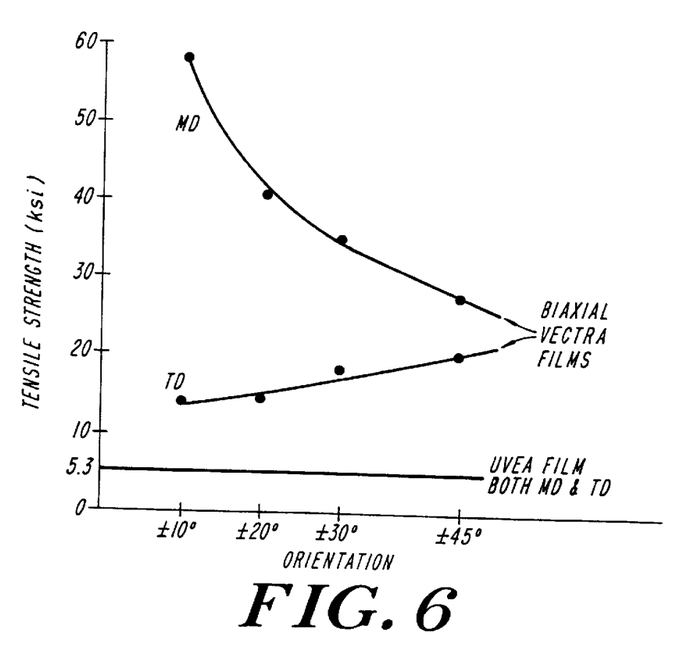
FIG. 6 is a graph illustrating the differences in tensile strength, in machine direction (MD) and in transverse direction (TD), between UVEA film and multiaxially oriented VECTRA® film.
Figure 7:
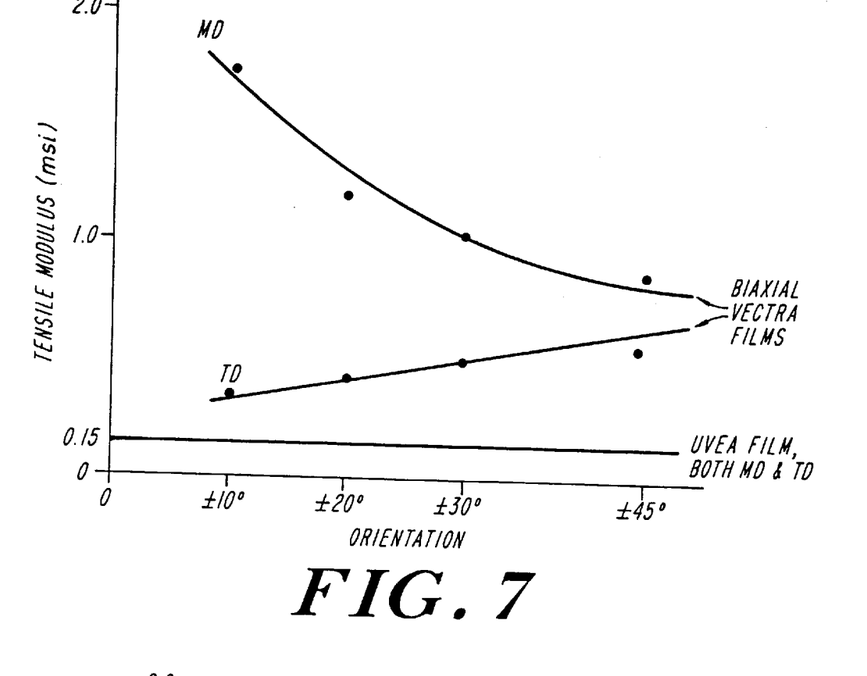
FIG. 7 is a graph of the relationship between tensile modulus and the extent of multiaxial orientation of VECTRA® film.

As the biaxiality approaches ±45°, the machine-direction and transverse-direction values of tensile strength and modulus converge, as shown in FIGS. 6 and 7, respectively.

Figure 8:
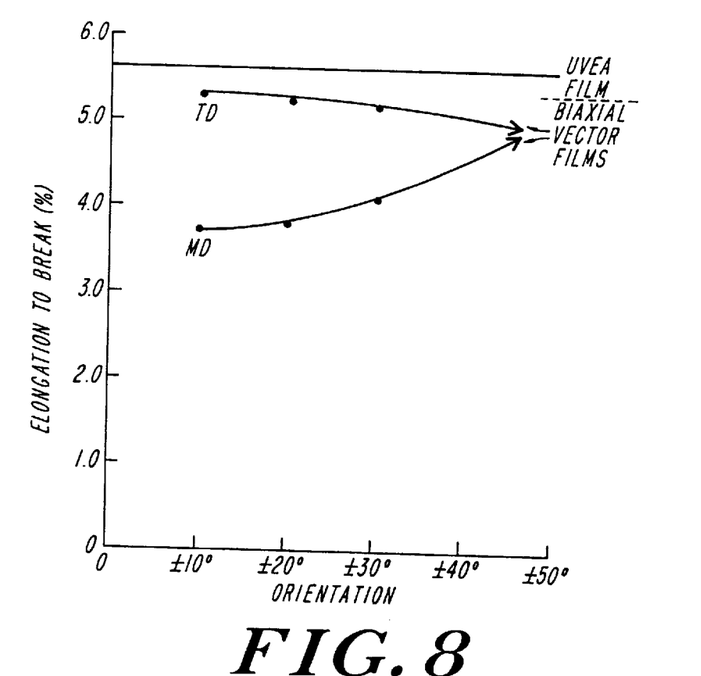
FIG. 8 is a graph of the relationship between percentage elongation to break and the extent of multiaxial orientation.

As shown in FIG. 8, the percent elongation at failure (break) in the machine and transverse directions also converges as the multiaxial orientation approaches ±45 degrees.

Figure 9:
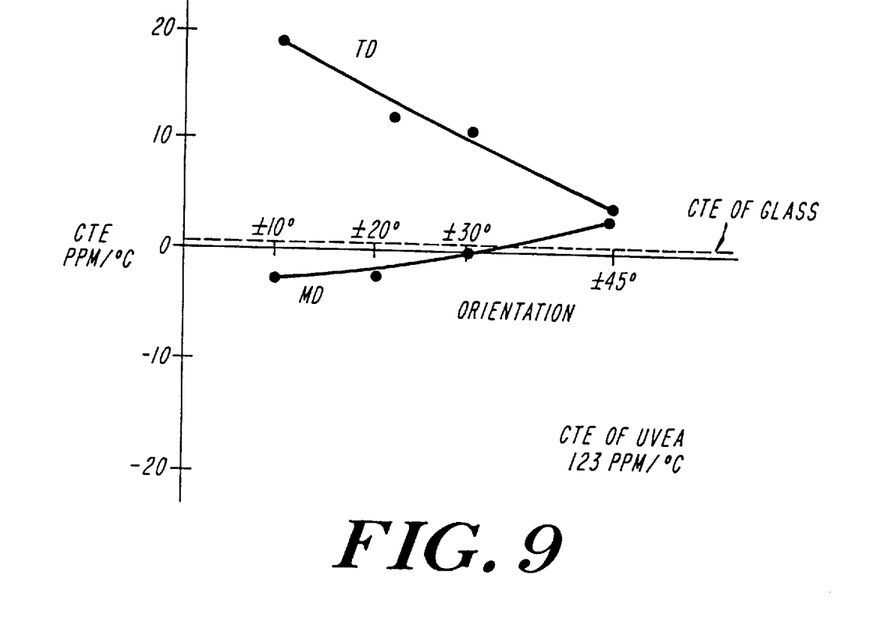
FIG. 9 is a graph of the relationship between CTE and the extent of multiaxial orientation.

As shown in FIG. 9, selected samples were tested for their CTE properties using ASTM D696. A Perkin-Elmer thermomechanical analyzer with a compression probe was used to obtain CTE values over a temperature range of −50° to +50° C. With increasing angular biaxial orientation, the machine direction CTE increased and the transverse direction CTE decreased. At a ±30° orientation, the LCP has a machine-direction CTE of zero. At a ±36.5° orientation, the CTE matches that of glass (0.5 ppm/°C.). In contrast, the CTE of UVEA, a standard coating used on optical fibers for guiding line-of-sight missiles, is 123 ppm/°C.

Moisture permeability was measured according ASTM F1249. Glass fibers are extremely sensitive to moisture and require coatings with minimal moisture permeability. Tests showed that multiaxially oriented VECTRA® film has permeability about 1,000 times lower than that of UVEA. Similar properties can be expected from multiaxially oriented coatings on glass fiber.

Moisture absorption was measured according to ASTM D570, and was found to be about 100 times lower for multiaxially oriented TLCP than for UVEA. See FIG. 1A, second column.

Extrusion of multiaxially oriented TLCP coatings onto elongated essentially non-planar members, such as glass rods, was carried out with an extrusion system similar to that shown in FIG. 5. The TLCP was coated continuously and seamlessly onto the surface of the elongated member. In addition to glass rods, suitable members are glass optical fibers, solid and hollow rods of glass and other materials, pipes, beams, and the like. Almost any elongated structure can be coated, as long as its cross-section is reasonably regular, e.g. rounded or polygonal.

EXAMPLE 2

MULTIAXIALLY ORIENTED COATING OF GLASS ROD MEMBERS

Five glass rods were coated with VECTRA® at ±20 degrees. This orientation corresponded to the highest rotation speed that was obtained with the counter-rotating die used in this experiment. The discharge diameter used was 0.5 inch (1.27 cm), to provide easier draw-down to the 0.36 inch (0.914 cm) outer diameter of the glass rod. The following system temperature profile was used:

| | |
|---|---|
| Extruder zone 1: | 480° F. (249° C.) |
| Extruder zone 2: | 510° F. (266° C.) |
| Extruder zone 3: | 520° F. (271° C.) |
| Pump block: | 530° F. (277° C.) |
| Die top and bottom: | 510° F. (266° C.) |

Prior to being coated, the glass rods were etched with a 7-percent hydrofluoric (HF) acid solution. Four of the five glass rods were heated to 510° F. (265° C.) to match the temperature of the exiting melt, and to improve adhesion. A one inch (2.54 cm) diameter single-screw extruder and a 2.5 cc/rev. gear pump were used. The extruder and pump were operated at 81.8 RPM and 50 RPM, respectively. The take-up speed or production rate was 62 inches (157.5 cm) per minute. The heated rods were uniformly coated with 1.5 mil (0.00381 cm) thick VECTRA®. The glass rods were heated, because of the relatively low rate of extrusion used, to avoid premature solidification of the TLCP coating; the low rate of extrusion was used to get a higher ±θ which resulted in a CTE that approached the CTE of the glass member (0.5 ppm/°C.). See FIG. 9, in which the dashed line indicates the CTE of glass.

To coat a glass optical fiber, similar equipment, scaled down proportionately because of the smaller member diameter, would be used. Preferably, a faster extrusion rate would be used. A vertical extrusion die axis would preferably be used since fiber drawing towers are oriented vertically and it would be most efficient to coat the fiber as it is produced. Preferably, the optical fiber would have a diameter not exceeding about 125 microns and the coating would have a thickness not exceeding about 100 microns, preferably not exceeding about 25 microns.

EXAMPLES 3

PROVIDING A MULTIAXIALLY ORIENTED TLCP COATING ONTO A HOLLOW CYLINDRICAL MEMBER

In these examples, a multiaxially oriented coating of VECTRA® A–950 was applied to the outer surface of polyethylene tubing, having an outer diameter of 1.1 inch (2.794 cm) and an inner diameter of 0.85 inch (2.159 cm), using a counter-rotating die similar to that shown in FIG. 5. The equipment used was as follows:

| | |
|---|---|
| Extruder type: | twin-screw, co-rotating, 25 mm diameter screws; |
| Melt pump type: | 2.92 cc/revolution; |
| Extrusion die: | counter-rotating, inner diameter 1.25 inch (3.175 cm), die gap 0.015 inch (0.0381 cm). |

The operating parameters and results of two runs were as follows:

| Parameter | Example 3 | Example 4 |
|---|---|---|
| Thickness of coating: | 0.0019 to 0.0023 inch (0.04826–0.05842 mm) | 0.0019 to 0.0023 inch (0.04826–0.05842 mm) |
| Orientation: | ±6 degrees | ±10 degrees |
| Extruder melt temperature: | 571° F. (300° C.) | 571° F. (300° C.) |
| Extruder RPM: | 60 | 60 |
| Melt pump RPM: | 20 | 20 |
| Outer Mandrel RPM: | 10 | 18 |
| Inner Mandrel RPM: | 10 | 18 |
| Take-up Speed: | 400"/min (1016 cm/min) | 400"/min (1016 cm/min) |

Those skilled in the art will realize that various changes are possible within the scope of the inventive concept. For example, other thermotropic LCPs capable of being multiaxially oriented may exist, or may be hereafter developed, and the method may be found useful for coating members other than elongated members. Further, various methods of bringing the extrudate into contact with the member may be developed. The multiaxial orientation of the TLCP coating can be solidified by physical, chemical, or thermal means known to those skilled in the art. Features of one embodiment described above may be combined with features of another embodiment. Therefore, the invention is not limited to the particular embodiments shown and described, but rather is defined by the following claims.

What is claimed is:

1. A coated product, comprising
an elongated essentially non-planar member and
a coating on said member, the coating comprising at least one multiaxially oriented thermotropic liquid crystalline polymer (TLCP).

2. The coated product of claim 1, wherein said multiaxially oriented TLCP is oriented, between about 5 degrees and about 75 degrees with respect to machine direction.

3. The coated product of claim 1, wherein said member is a flexible material suitable for spooling onto a reel.

4. The coated product of claim 3, wherein said flexible member comprises glass, plastic, ceramic, or metal.

5. The coated product of claim 3, wherein said flexible member is a glass fiber.

6. The coated product of claim 1, wherein said member is essentially a rigid element.

7. The coated product of claim 1, wherein said member is a cylinder.

8. The coated product of claim 7, wherein said cylinder is hollow.

9. The coated product of claim 1, wherein said member is an object having a polygonal cross-section.

10. The coated product of claim 1, wherein said member is an object having a generally oval cross-section.

11. The coated product of claim 1, wherein the thermotropic LCP comprises a wholly aromatic polyester or copolyester.

12. The coated product of claim 11, wherein the thermotropic LCP comprises a partially aromatic polyester or copolyester.

13. The coated product in accordance with claim 11, wherein the wholly aromatic polyester or copolyester comprises 6-oxy-2-naphthoyl and p-oxybenzoyl moieties.

14. The coated product in accordance with claim 11, wherein the wholly aromatic polyester or copolyester comprises VECTRA® A950.

15. The coated product in accordance with claim 11, wherein the wholly aromatic polyester or copolyester comprises hydroxy benzoic acid/phenyl hydroquinone/dimethyl-napthylene dicarboxylate units.

16. The coated product in accordance with claim 11, wherein the wholly aromatic polyester or copolyester comprises ZENITE™.

17. The coated product in accordance with claim 11, wherein the wholly aromatic polyester or copolyester is XYDAR™, VECTRA®, SUMIKASUPER®, EKONAL™, HX™, ZENITE™, RODRUN® or GRANLAR™.

* * * * *